United States Patent
Den Brok et al.

(10) Patent No.: US 9,807,245 B2
(45) Date of Patent: Oct. 31, 2017

(54) FORWARDING TELEPHONE CALLS TO A MOBILE TERMINAL VIA A FEMTOCELL

(71) Applicant: Telefonaktiebolaget L M Ericsson (publ), Stockholm (SE)

(72) Inventors: Antoine Den Brok, CR Rljen (NL); Jan Bot, GV Nieuwendijk (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/763,780

(22) PCT Filed: Jan. 30, 2013

(86) PCT No.: PCT/EP2013/051816
§ 371 (c)(1),
(2) Date: Jul. 27, 2015

(87) PCT Pub. No.: WO2014/117834
PCT Pub. Date: Aug. 7, 2014

(65) Prior Publication Data
US 2015/0365534 A1    Dec. 17, 2015

(51) Int. Cl.
| H04M 3/42 | (2006.01) |
| H04M 7/00 | (2006.01) |
| H04M 3/04 | (2006.01) |
| H04W 8/08 | (2009.01) |
| H04W 40/34 | (2009.01) |
| H04W 84/04 | (2009.01) |

(52) U.S. Cl.
CPC ........... *H04M 7/0057* (2013.01); *H04M 3/04* (2013.01); *H04M 3/42042* (2013.01); *H04M 3/42263* (2013.01); *H04M 3/42357* (2013.01); *H04W 8/082* (2013.01); *H04W 40/34* (2013.01); *H04M 2207/206* (2013.01); *H04M 2242/30* (2013.01); *H04W 84/045* (2013.01)

(58) Field of Classification Search
None
See application file for complete search history.

(56) References Cited

U.S. PATENT DOCUMENTS

| 2007/0167167 A1 * | 7/2007 | Jiang ..................... H04M 3/548 455/453 |
| 2008/0126216 A1 * | 5/2008 | Flensted-Jensen .... G06Q 30/04 705/26.1 |

(Continued)

FOREIGN PATENT DOCUMENTS

| WO | 2008054194 A1 | 5/2008 |
| WO | 2009082805 A1 | 7/2009 |
| WO | 2011141663 A1 | 11/2011 |

*Primary Examiner* — Idowu O Osifade
(74) *Attorney, Agent, or Firm* — Murphy, Bilak & Homiller, PLLC

(57) ABSTRACT

An application server for use in a telecommunications network. The application server comprises a receiver for receiving an indication of a call setup or message to a fixed line telephone number of a subscriber, a determining unit for determining whether a mobile station of the subscriber is connected to a home femtocell of the subscriber, and a redirection unit for causing the call setup or message to be redirected towards the mobile station if the subscriber's mobile station is connected to the home femtocell.

13 Claims, 4 Drawing Sheets

(56) References Cited

U.S. PATENT DOCUMENTS

| | | | |
|---|---|---|---|
| 2008/0244148 A1* | 10/2008 | Nix, Jr. | H04L 41/0856 710/313 |
| 2008/0287148 A1* | 11/2008 | Silver | H04L 12/5895 455/466 |
| 2011/0263274 A1* | 10/2011 | Fox | H04W 60/00 455/456.2 |

* cited by examiner

FORWARDING TELEPHONE CALLS TO A MOBILE TERMINAL VIA A FEMTOCELL

TECHNICAL FIELD

The invention relates to advanced routing services for telecommunications system users.

BACKGROUND

In current telecommunications networks, it is possible to automatically forward calls directed to one number to a second number based on certain settings. For example, calls may be forwarded if the number is busy, if the number is not reachable (e.g. a mobile phone with no signal), or if there is no answer within a specified period of time. It is also possible to unconditionally forward all calls directed to a number to a second number. Some network operators may charge the subscriber of the first number for the forwarding service.

The first number may be a virtual number, with no associated destination, which forwards calls to the second number (e.g. a premium rate number which forwards calls to the fixed line telephone number of the business it is registered to).

SUMMARY

It is an object of the present invention to mitigate at least some of the above disadvantages and provide an improved system for telecommunications.

According to a first aspect of the present invention there is provided an application server for use in a telecommunications network. The application server comprises a receiver for receiving an indication of a call setup or message to a fixed line telephone number of a subscriber, a determining unit for determining whether a mobile station of the subscriber is connected to a home femtocell of the subscriber, and a redirection unit for causing the call setup or message to be redirected towards the mobile station if the subscriber's mobile station is connected to the home femtocell.

The determining unit may be further configured to identify a basestation to which the mobile station is connected by querying a Home Location Register, HLR, or Home Subscriber Service, HSS.

The redirection unit may be further configured such that, if the mobile station of the subscriber is connected to a basestation different to the home femtocell, the call or message is directed to the fixed line telephone number, or redirected to one of a voicemail service, the mobile station, or a destination specified in subscriber preferences.

According to a second aspect of the present invention there is provided an application server for use in a telecommunications network. The application server comprises an input/output (I/O) unit, a data storage unit for storing a database of subscribers and associated fixed line telephone numbers, mobile stations, and home femtocells, a memory unit for storing instructions, and a processing unit for interpreting the instructions to perform a method.

The method performed by the processing unit comprises, in response to the I/O unit receiving a notification of an incoming call setup or message to a fixed line telephone number of a subscriber, identifying a mobile station of the subscriber and a home femtocell of the subscriber from the database. The method further comprises causing the I/O unit to query a Home Location Register, HLR, or Home Subscriber Service, HSS, to identify a basestation to which the mobile station of the subscriber is connected, and determining whether the basestation to which the mobile station is connected is the home femtocell of the subscriber. The method further comprises, if the mobile station is connected to the home femtocell, causing the call setup or message to be directed towards the mobile station.

According to a third aspect of the present invention there is provided a method in an application server of a telecommunications network. The method comprises receiving an indication of a call setup or message to a fixed line telephone number of a subscriber, determining whether a mobile station of the subscriber is connected to a home femtocell of the subscriber, and if the mobile station is connected to the home femtocell, causing the call setup or message to be redirected towards the mobile station.

A basestation to which the mobile station is connected may be identified by querying a Home Location Register, HLR, or Home Subscriber Service, HSS.

The step of determining may comprise querying a HLR or HSS, and receiving a response indicating whether the mobile station is connected to the home femtocell.

The method may comprise, if the mobile station of the subscriber is connected to a basestation different to the home femtocell, directing the call setup or message towards the fixed line telephone number, or redirecting the call setup or message towards one of a voicemail service, the mobile station or a destination specified in subscriber preferences.

According to a fourth aspect of the present invention there is provided an application server for use in a telecommunications network. The application server comprises a receiver for receiving an indication of an outgoing call setup or message from a subscriber's mobile station, a determining unit for determining whether the mobile station is connected to a home femtocell of the subscriber, and a signalling modifier for causing a presentation number of the outgoing call setup or message to be changed to a fixed line telephone number for the subscriber if the mobile station is connected to the home femtocell.

The determining unit may be further configured to identify a basestation to which the mobile station is connected by querying a Home Location Register, HLR, or Home Subscriber Service, HSS.

According to a fifth aspect of the present invention there is provided a further application server for use in a telecommunications network. The application server comprises an input/output (I/O) unit, a data storage unit for storing a database of subscribers and associated fixed line telephone numbers, mobile stations, and home femtocells, a memory unit for storing instructions, and a processing unit for interpreting the instructions to perform a method.

The method performed by the processing unit comprises, in response to the I/O unit receiving an indication of an outgoing call setup or message from a subscriber's mobile station, identifying a fixed line telephone number of the subscriber and a home femtocell of the subscriber from the database. The method further comprises causing the I/O unit to query a Home Location Register, HLR, or Home Subscriber Service, HSS, to identify a basestation to which the mobile station of the subscriber is connected and determining whether the basestation to which the mobile station is connected is the home femtocell of the subscriber. The method further comprises, if the mobile station is connected to the home femtocell, causing a presentation number of the outgoing call setup or message to be changed to a fixed line telephone number of the subscriber.

According to a sixth aspect of the present invention there is provided a method in an application server in a telecommunications network. The method comprises receiving an indication of an outgoing call setup or message from a subscriber's mobile station, determining whether the mobile station is connected to a home femtocell of the subscriber, and, if the mobile station is connected to the home femtocell, causing a presentation number of the outgoing call setup or message to be changed to a fixed line telephone number of the subscriber.

A basestation to which the mobile station is connected may be identified by querying a Home Location Register, HLR, or Home Subscriber Service, HSS.

The step of determining may comprise querying a HLR or HSS, and receiving a response indicating whether the mobile station is connected to the home femtocell.

DETAILED DESCRIPTION

A system is presented to forward calls to a mobile station if the mobile station is connected to the subscriber's femtocell. For example, this may be used to implement a "virtual home number", i.e. forwarding calls made to a user's fixed line telephone number to their mobile phone if their mobile phone was connected to a femtocell located in the home. The system can also allow a user to appear as if they are calling from the telephone associated with the virtual home number when making an outgoing call while connected to the femtocell.

A femtocell is a small, low powered basestation in a mobile network, with a range in the order of 10 meters. Femtocells are typically designed for use in homes or small businesses. Mobile stations can connect to the femtocell in the same way as a standard basestation, and the connection is then routed to the service provider over the internet (e.g. a DSL or cable internet connection).

Femtocells allow a mobile operator to obtain better coverage indoors, and allow the user to guarantee the service level in their home or business. The femtocell may provide other features, such as limiting the subscribers that can connect to it, or allowing access to services on the home network such as automatically synchronising data between the phone and a computer.

For example, a network operator may offer a subscription that includes both a fixed line and a mobile telephone service, and a femtocell routing package. This subscription may include a femtocell for installation in the subscriber's home. The fixed line connection and mobile network connection may be handled by different sections of the network operator's network (hereafter the "fixed line network" and "mobile network"). The fixed line connection and mobile network connection each have an associated telephone number (hereafter the "fixed line number" and "mobile number"). These telephone numbers may be telephone numbers according to the E.164 standard.

Calls set up towards the fixed line telephone ("the terminating scenario") will be routed towards the fixed line network. The fixed line network first checks whether the subscriber has a subscription including a femtocell routing package. This is achieved by using an application server which monitors all incoming calls in the fixed line network.

Figure 1:
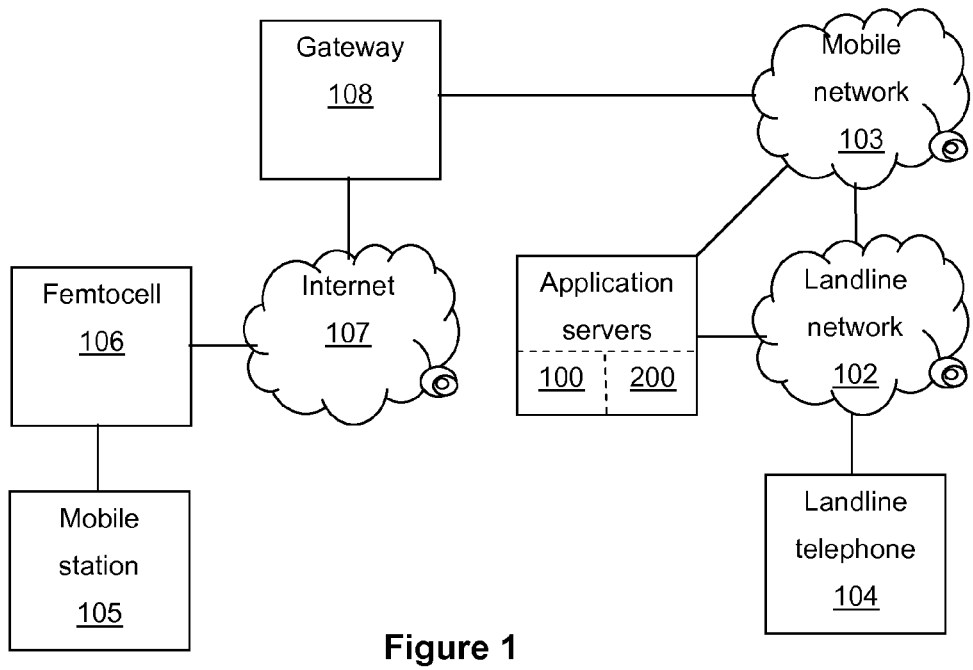
FIG. 1 is a schematic representation of a telecommunications network.

An illustration of a network incorporating the application server is shown in FIG. 1. The application server 100 is connected to both the fixed line network 102 and the mobile network 103. The fixed line network 102 provides service to a fixed line telephone 104, and the mobile network 103 provides service to a mobile station 105 by way of a femtocell 106. The femtocell 106 is connected to the Internet 107, and the connection between the internet 107 and the mobile network 103 is handled by a gateway 108.

Figure 2:
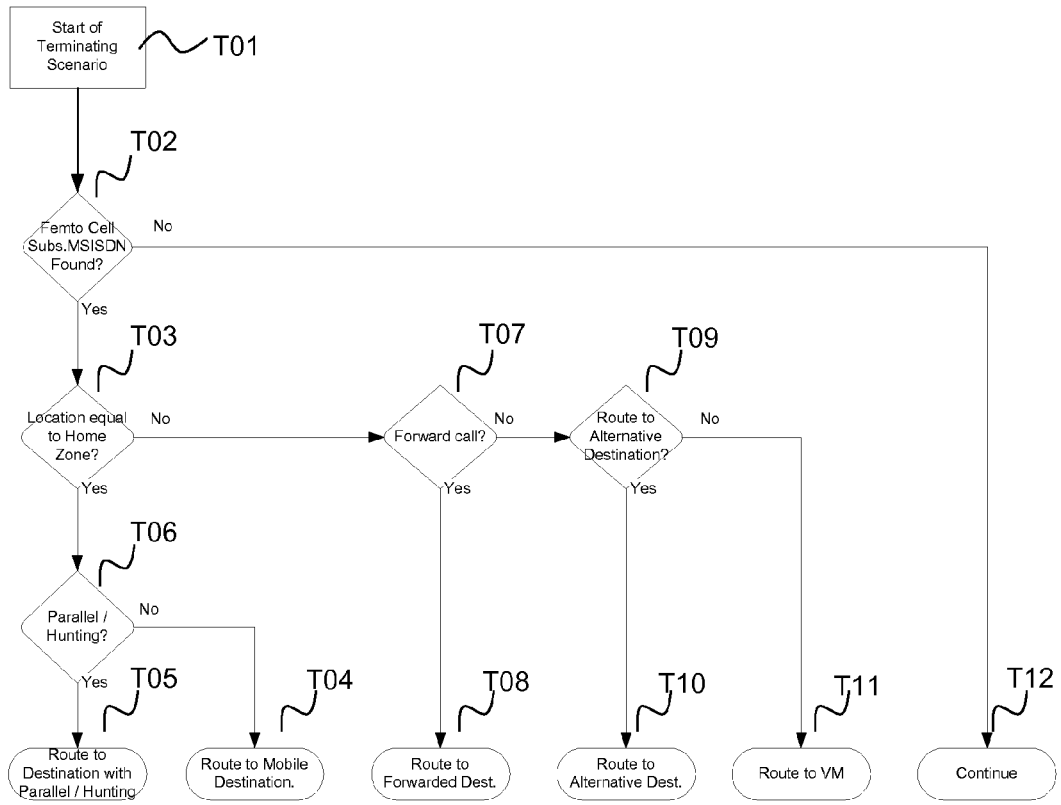
FIG. 2 is a flowchart illustrating the terminating scenario.

FIG. 2 is a flowchart illustrating the operation of the application server. The application server receives an indication of a call setup, including the called party number (CDPN) (T01). The application server determines if the subscriber associated with the CDPN has a femtocell routing package, e.g. by looking in a subscriber database to find an MSISDN associated with the CDPN (T02). If the subscriber does not have such a package, then the call is routed towards the fixed line number as normal (e.g. to a fixed telephone in the subscriber's home) (T12).

If the subscriber does have a femtocell routing package, then the application server looks in the subscriber database to find the MSISDN of the subscriber's mobile service, the identity of the subscriber's femtocell, and any routing preferences that the subscriber has set. The application server then checks if the subscriber's mobile device is connected to the femtocell (T03). In a GSM network, this may be achieved by sending an AnyTimeInterrogation (ATI) command to the HLR, which will return an identifier for the basestation which the subscriber's mobile station is connected to. This identifier can then be checked to see if it matches the identifier for the femtocell. Other mobile telecommunications network standards have equivalent methods of determining the basestation to which a mobile station is connected, and these will be obvious to the skilled person.

Alternatively, the HLR may store the data about the femtocell routing packages. In this case, the application server can query the HLR without looking in the subscriber database, and the HLR can respond indicating whether or not the subscriber's mobile station is connected to the femtocell.

If the subscriber is connected to the femtocell, then the application server causes the call setup to be redirected to the subscriber's mobile number (T04). This may be instead of, or in addition to, routing the call setup to the fixed line number. The call my be routed by "parallel ringing", i.e. causing both the mobile station and the fixed line telephone to ring, and continuing the call with whichever is answered first. Alternatively, the call setup may be routed by a "hunting" mechanism, e.g. first routed to the mobile number, and then to the fixed line number if there is no answer within a specified period of time, or vice versa (T05). One of these options may be selected based on network defaults, or the subscriber routing preferences (T06).

If the subscriber is not connected to the femtocell, the application server may cause the call setup to be redirected to the mobile number (T07, T08), to the fixed line number (T09, T10), or to the subscriber's voicemail (T11). The routing may be recorded by the network, for example so that the subscriber can be charged for having the call forwarded to their mobile number. One of these options may be selected based on network defaults, or subscriber routing preferences.

Figure 3:
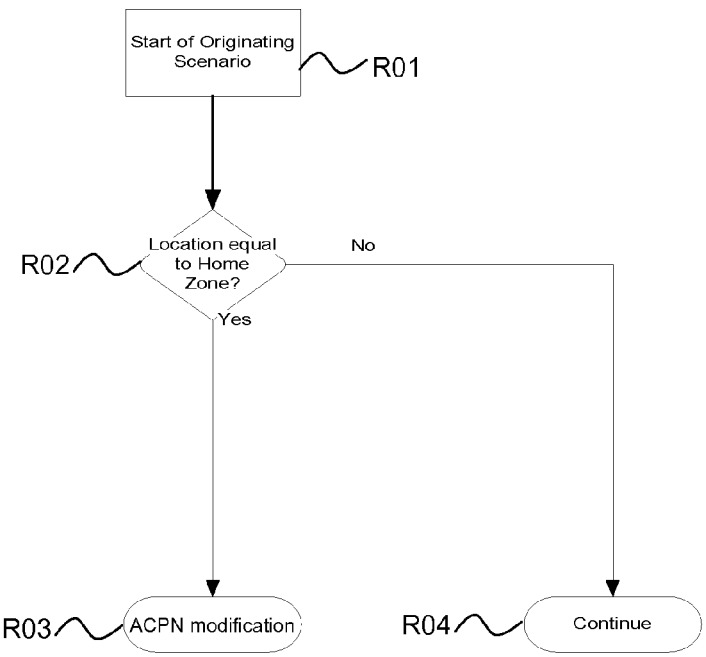
FIG. 3 is a flowchart illustrating the originating scenario.

A similar application server 200 can be used to allow the subscriber to make calls from their mobile station as if they were using the fixed line ("the originating scenario"). FIG. 3 is a flowchart illustrating this method.

The application server receives an indication of a call being set up by the mobile station of a subscriber with a femtocell routing subscription (R01). The server then determines the location of the subscriber as before (R02). If the subscriber is connected to their femtocell, then the application number changes the presentation number (Additional Calling Party Number, ACPN) of the outgoing call to the fixed line number, so that it appears as if the subscriber is making the call from the fixed line (R03). If the subscriber is not connected to their femtocell, the call setup will proceed as normal (R04).

Figure 4:
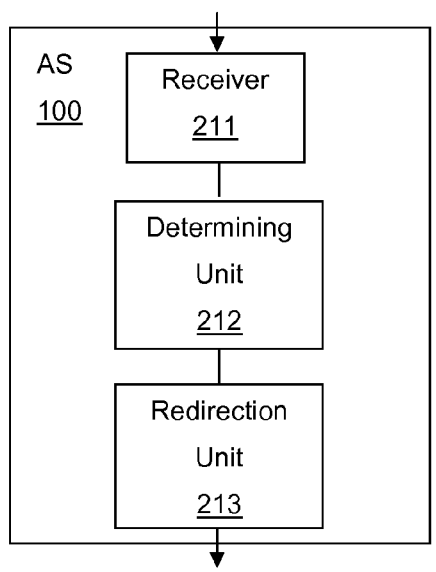
FIG. 4 illustrates schematically an application server for use in the terminating scenario.

FIG. 4 is a schematic illustration of an application server 100 for use in the terminating scenario. The application server comprises a receiver 211 for receiving an indication of a call setup or message to a fixed line telephone number of a subscriber, a determining unit 212 for determining whether a mobile station of the subscriber is connected to a home femtocell of the subscriber, and a redirection unit 213 for causing the call setup or message to be redirected towards the mobile station if the subscriber's mobile station is connected to the home femtocell.

Figure 5:
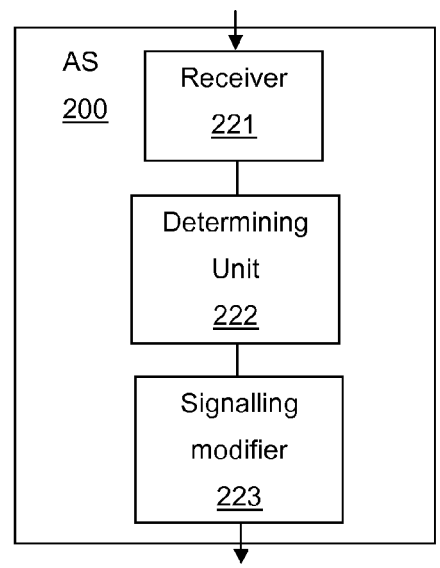
FIG. 5 illustrates schematically an application server for use in the originating scenario.

FIG. 5 is a schematic illustration of an application server 200 for use in the originating scenario. The application server comprises a receiver 221 for receiving a notification of an outgoing call setup or message from a subscriber's mobile station, a determining unit 222 for determining whether the mobile station is connected to a home femtocell of the subscriber, and a signalling modifier 223 for causing a presentation number of the outgoing call setup or message to be changed to a fixed line telephone number for the subscriber if the mobile station is connected to the home femtocell.

The components for the originating and terminating scenarios may be housed in the same server. If so, the determining units 212 and 222 may be combined.

Figure 6:
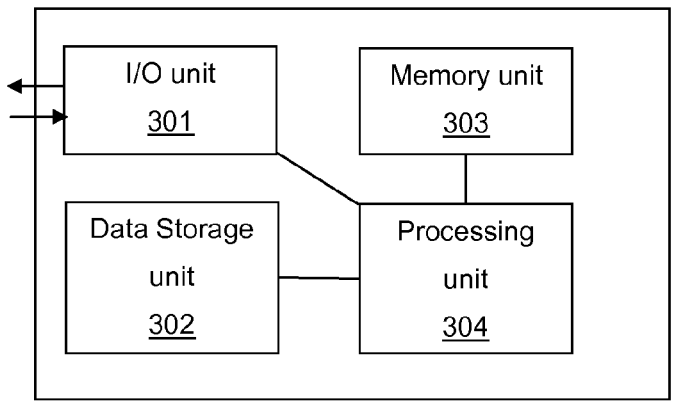
FIG. 6 illustrates schematically an application server according to an alternative configuration.

FIG. 6 is a schematic illustration of an alternative application server. The application server comprises an input/output (I/O) unit 301, a data storage unit 302 for storing a database of subscribers and associated fixed line telephone numbers, mobile stations, and home femtocells, a memory unit 303 for storing instructions, and a processing unit 304 for interpreting the instructions to perform a method.

In the terminating scenario the method comprises, in response to the I/O unit 301 receiving a notification of an incoming call setup or message to a fixed line telephone number of a subscriber, identifying a mobile station of the subscriber and a home femtocell of the subscriber from the database. The method further comprises causing the I/O unit 301 to query a Home Location Register, HLR, or Home Subscriber Service, HSS, to identify a basestation to which the mobile station of the subscriber is connected, and determining whether the basestation to which the mobile station is connected is the home femtocell of the subscriber. The method further comprises, if the mobile station is connected to the home femtocell, causing the call setup or message to be directed towards the mobile station.

In the originating scenario, the method comprises, in response to the I/O unit 301 receiving an indication of an outgoing call setup or message from a subscriber's mobile station, identifying a fixed line telephone number of the subscriber and a home femtocell of the subscriber from the database. The method further comprises causing the I/O unit 301 to query a Home Location Register, HLR, or Home Subscriber Service, HSS, to identify a basestation to which the mobile station of the subscriber is connected and determining whether the basestation to which the mobile station is connected is the home femtocell of the subscriber. The method further comprises, if the mobile station is connected to the home femtocell, causing a presentation number of the outgoing call setup or message to be changed to a fixed line telephone number of the subscriber.

The instructions may be in the form of a computer program, comprising computer readable code. The computer program may be comprised in a computer program product, the computer program product comprising a non-transitory computer readable medium and the computer program comprising computer readable code, wherein the computer readable code is stored on the non-transitory computer readable medium.

Figure 7:
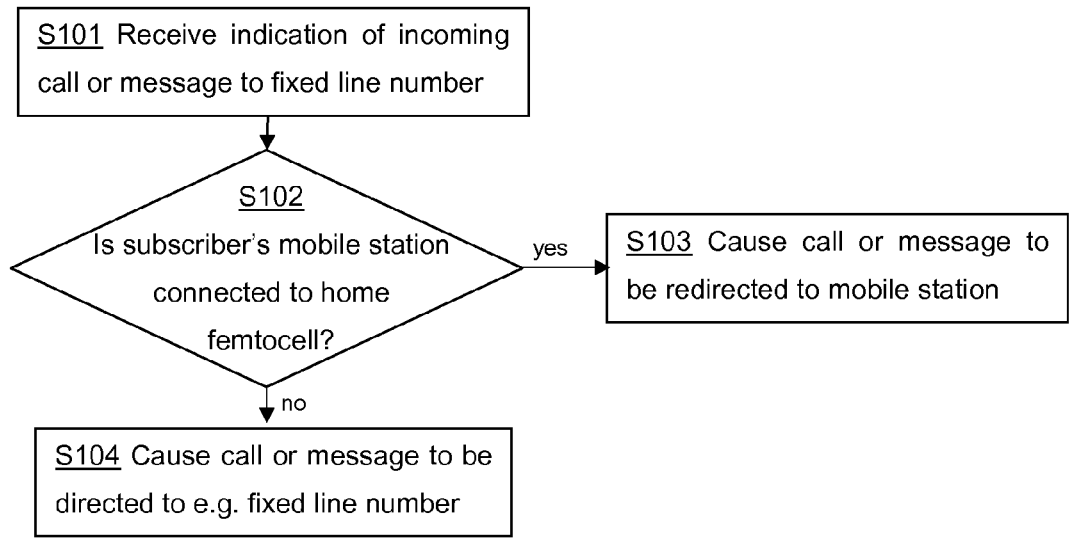
FIG. 7 is a flowchart illustrating the method in an application server for the terminating scenario.

FIG. 7 is a flowchart of a method in an application server. The application server receives an indication of an incoming call setup or message to a subscriber's fixed line number S101. The application server then determines whether the subscriber's mobile station is connected to the subscriber's home femtocell S102. If so, the application server causes the call setup or message to be redirected to the mobile station S103. If not, the application server causes the call setup or message to be redirected to, for example, the fixed line number, or the subscriber's voicemail S104.

Figure 8:
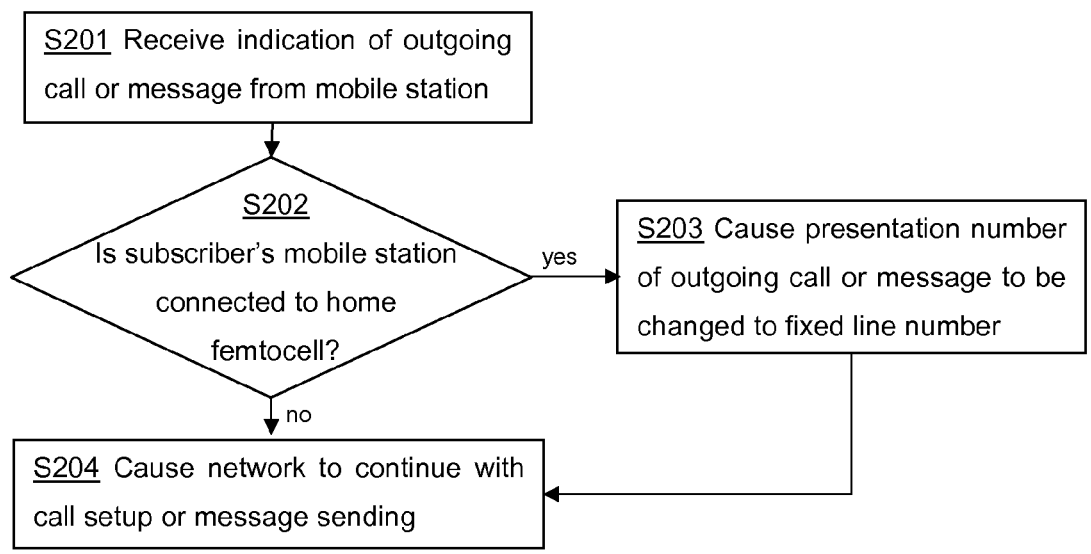
FIG. 8 is a flowchart illustrating the method in an application server for the originating scenario.

FIG. 8 is a flowchart of a method in an application server. The application server receives an indication of an outgoing call setup or message from a subscriber's mobile station S201. The application server determines if the subscriber's mobile station is connected to the subscriber's home femtocell S202. If so, the application server causes the presentation number of the outgoing call setup or message to be changed to the subscriber's fixed line telephone number S203. The application server then instructs the network to continue with the call setup or message sending S204.

Advantages of routing calls according to the methods described above include the user having the convenience of making and receiving calls on his or her mobile device, while still being able to present a fixed line number to the recipients and callers (which may look more professional, or simply be a matter of personal preference). The advanced routing requires an application server, but no other changes to existing infrastructure are required (though there are some optional new routines in the HLR). In the terminating scenario, the network may charge less for the femtocell routing than for normal call forwarding to a mobile device, as the femtocell uses the user's broadband connection rather than the telecommunications network infrastructure.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein. For example, while the above embodiments refer to a voice call, the invention is equally applicable to redirecting any communication, such as SMS or other messages. Further, while the above embodiments refer to a "fixed line number", this is by way of example only, and need not correspond to a fixed telephone, e.g. it may be a virtual number with no physical device associated.

The invention claimed is:

1. An application server for use in a telecommunications network, the application server comprising:
   an input/output circuit configured to receive an indication of a call setup or message to a fixed line telephone number of a subscriber; and
   a processing circuit configured to:
      determine whether a mobile station assigned a mobile station number of the subscriber is connected to a home femtocell of the subscriber and to cause the call setup or message to be redirected towards the mobile station number in response to determining that the subscriber's mobile station is connected to the home femtocell; and
      identify a base station to which the mobile station is connected by querying a Home Location Register (HLR) or Home Subscriber Service (HSS).

2. The application server of claim 1, wherein the processing circuit is further configured such that, if the processing circuit determines that the mobile station of the subscriber is connected to a base station different to the home femtocell, the processing circuit:
   redirects the call setup or message towards a voicemail service;
   directs the call setup or message towards the fixed line telephone number;
   redirects the call setup or message towards the mobile station number; or
   redirects the call setup or message towards a destination specified in subscriber preferences.

3. An application server for use in a telecommunications network, the application server comprising:
   an input/output (I/O) circuit;
   a data storage circuit configured to store a database of subscribers and associated fixed line telephone numbers, mobile stations, and home femtocells;
   a memory circuit storing instructions;
   a processor configured to interpret the instructions to perform a method comprising:
      in response to the I/O circuit receiving a notification of an incoming call setup or message to a fixed line telephone number of a subscriber:
         identifying a mobile station assigned a mobile station number of the subscriber and a home femtocell of the subscriber from the database;
         causing the I/O circuit to query a Home Location Register (HLR) or Home Subscriber Service (HSS) to identify a base station to which the mobile station of the subscriber is connected;
         determining whether the base station to which the mobile station is connected is the home femtocell of the subscriber; and
         in response to determining that the mobile station is connected to the home femtocell, causing the call setup or message to be directed towards the mobile station number.

4. A method in an application server of a telecommunications network, the method comprising:
   receiving an indication of a call setup or message to a fixed line telephone number of a subscriber;
   determining whether a mobile station assigned a mobile station number of the subscriber is connected to a home femtocell of the subscriber, responsive to receiving the indication; and
   in response to determining that the mobile station is connected to the home femtocell, causing the call setup or message to be redirected towards the mobile station number, wherein a base station to which the mobile station is connected is identified by querying a Home Location Register (HLR) or Home Subscriber Service (HSS).

5. The method of claim 4, wherein the step of determining comprises querying the HLR or HSS and receiving a response indicating whether the mobile station is connected to the home femtocell.

6. The method of claim 4, further comprising, in response to determining that the mobile station of the subscriber is connected to a base station different to the home femtocell:
   redirecting the call setup or message towards a voicemail service;
   directing the call setup or message towards the fixed line telephone number;
   redirecting the call setup or message towards the mobile station number; or
   redirecting the call setup or message towards a destination specified in subscriber preferences.

7. An application server for use in a telecommunications network, the application server comprising:
   a receiver circuit configured to receive an indication of an outgoing call setup or message from a subscriber's mobile station; and
   a processing circuit configured to determine whether the mobile station is connected to a home femtocell of the subscriber and, in response to determining that the mobile station is connected to the home femtocell, causing a presentation number of the outgoing call setup or message to be changed to a fixed line telephone number for the subscriber.

8. The application server of claim 7, wherein the processing circuit is further configured to identify a base station to which the mobile station is connected by querying a Home Location Register (HLR) or Home Subscriber Service (HSS).

9. An application server for use in a telecommunications network, the application server comprising:
   an input/output (I/O) circuit;
   a data storage circuit configured to store a database of subscribers and associated fixed line telephone numbers, mobile stations, and home femtocells;
   a memory circuit storing instructions;
   a processor configured to interpret the instructions to perform a method comprising:
      in response to the I/O circuit receiving an indication of an outgoing call setup or message from a subscriber's mobile station:
         identifying a fixed line telephone number of the subscriber and a home femtocell of the subscriber from the database;
         causing the I/O unit to query a Home Location Register (HLR) or Home Subscriber Service (HSS), to identify a base station to which the mobile station of the subscriber is connected;
         determining whether the base station to which the mobile station is connected is the home femtocell of the subscriber; and
         in response to determining that the mobile station is connected to the home femtocell, causing a presentation number of the outgoing call setup or message to be changed to a fixed line telephone number of the subscriber.

10. A method in an application server in a telecommunications network, the method comprising:
- receiving an indication of an outgoing call setup or message from a subscriber's mobile station;
- determining whether the mobile station is connected to a home femtocell of the subscriber;
- if the mobile station is connected to the home femtocell, causing a presentation number of the outgoing call setup or message to be changed to a fixed line telephone number of the subscriber.

11. The method of claim 10, further comprising identifying a base station to which the mobile station is connected by querying a Home Location Register (HLR) or Home Subscriber Service (HSS).

12. The method of claim 10, wherein the step of determining comprises querying a HLR or HSS, and receiving a response indicating whether the mobile station is connected to the home femtocell.

13. A non-transitory computer-readable medium comprising, stored thereupon, a computer program comprising computer readable code that, when run on an application server of a telecommunications network, causes the application server to:
- receive an indication of a call setup or message to a fixed line telephone number of a subscriber;
- determine whether a mobile station assigned a mobile station number of the subscriber is connected to a home femtocell of the subscriber, in response to receiving the indication; and
- cause the call setup or message to be redirected towards the mobile station number, in response to determining that the mobile station is connected to the home femtocell, wherein a base station to which the mobile station is connected is identified by querying a Home Location Register (HLR) or Home Subscriber Service (HSS).

* * * * *